United States Patent
Coronado et al.

[19]

[11] Patent Number: 5,899,236
[45] Date of Patent: May 4, 1999

[54] REINFORCED, ELECTRICALLY INSULATING HOSE

[76] Inventors: Eduardo Quintanilla Coronado; Jesus Hinojosa Coronado, both of Via Flamina #307, Garza Garcia N.L. 66220, Mexico

[21] Appl. No.: 08/891,461

[22] Filed: Jul. 10, 1997

Related U.S. Application Data

[63] Continuation of application No. 08/626,801, Apr. 3, 1996, Pat. No. 5,803,129.

[30] Foreign Application Priority Data

Sep. 28, 1995 [MX] Mexico .................................... 954141

[51] Int. Cl.⁶ ........................................................ F16L 11/00
[52] U.S. Cl. ........................... 138/125; 138/109; 138/126
[58] Field of Search ................................ 138/123, 124, 138/125, 126, 109

[56] References Cited

U.S. PATENT DOCUMENTS

| | | | |
|---|---|---|---|
| 459,509 | 9/1891 | Johns | 138/125 |
| 2,009,075 | 7/1935 | Thompson | 138/125 |
| 2,754,848 | 7/1956 | Knowland et al. | 156/49 |
| 3,060,973 | 10/1962 | Mlinar | 138/125 |
| 3,599,677 | 8/1971 | O'Brien | 138/121 |
| 3,972,757 | 8/1976 | Derderian et al. | 156/125 |
| 4,159,027 | 6/1979 | Caillet | 138/127 |
| 4,431,031 | 2/1984 | Ettlinger | 138/109 |
| 4,567,917 | 2/1986 | Millard | 138/126 |
| 4,589,688 | 5/1986 | Johnson | 285/12 |
| 4,804,212 | 2/1989 | Vyse | 285/256 |
| 4,817,997 | 4/1989 | Ingram | 285/256 |
| 4,905,736 | 3/1990 | Kitami et al. | 138/137 |
| 4,961,977 | 10/1990 | Archer et al. | 428/36.3 |
| 4,991,876 | 2/1991 | Mulvey | 285/21 |
| 5,024,419 | 6/1991 | Mulvey | 251/148 |
| 5,413,147 | 5/1995 | Moreiras et al. | 138/109 |
| 5,622,210 | 4/1997 | Crisman et al. | 138/104 |

FOREIGN PATENT DOCUMENTS 25 22 288  12/1975  Germany .

OTHER PUBLICATIONS

Exemplary Sales Invoice, dated Jul. 5, 1993.

*Primary Examiner*—William Stryjewski
*Attorney, Agent, or Firm*—Baker & McKenzie

[57] ABSTRACT

An improved reinforced hose for conducting fluids and gases, and a method of manufacturing that hose, are disclosed herein. The improved reinforced hose includes an interior tube having an inner bore and an outer surface. The improved reinforced hose also includes an outer covering disposed directly about the outer surface of the interior tube. Such outer covering includes one or more layers of plastic threads, which are formed by disposing a plastic substance about core material. The improved reinforced hose may be used as an electrically insulating connection between a city water main or other water supply line and an appliance such as a water heater.

22 Claims, 4 Drawing Sheets

REINFORCED, ELECTRICALLY INSULATING HOSE

RELATED PATENTS

This patent application is a continuation of U.S. patent application Ser. No. 08/626,801 filed Apr. 3, 1996, now U.S. Pat. No. 5,803,129 and claims priority from the same under 35 U.S.C. § 120.

FIELD OF THE INVENTION

The present invention relates to an improved reinforced hose for conducting fluids and gases there through and a method of manufacturing such a hose more particularly, the present invention relates to a reinforced hose that possesses several advantageous attributes—such as, improved flexibility increased resistivity to internal pressure and rupture, simplified manufacturing methods, decreased manufacturing costs, decreased weight, and increased resistance to corrosion. Also provided is a novel electrically-insulating connection between a city water main or other water supply line and an appliance such as a water heater.

BACKGROUND OF THE INVENTION

Presently, many different types and constructions of hoses are known. Some hoses are simple ducts or tubes manufactured from materials such as rubber or plastic. However, such hoses are unable to withstand relatively high internal pressures resulting from the conduction of fluids or gases through the hoses at high velocities. To withstand high internal pressures, reinforced hoses may be employed.

Certain conventional reinforced hoses apply a braided layer of nylon or various metal wires about a tube. Hoses reinforced with nylon have relatively low resistances to high internal pressures. Hoses reinforced with aluminum are similarly unable to resist relatively high pressures. Furthermore, aluminum reinforced hoses are highly susceptible to corrosion, especially when in the presence of acids or detergents. Because of these and other disadvantages, nylon and aluminum reinforced hoses are only used in limited applications.

Hoses reinforced with stainless steel, due in part to their relatively high resistance to pressures, have enjoyed more commercial success than their nylon and aluminum counterparts. While stainless steel reinforced hoses are able to withstand higher pressures than aluminum and nylon reinforced hoses, they possess several undesirable attributes. First, such hoses are relatively inflexible. That is, stainless steel reinforced hoses can kink and permanently disfigure if contorted in various manners. This results in the restriction of flow of liquids or gases through the hose. Second, manufacturing a hose having a metal reinforcement is relatively cumbersome and costly in light of the necessary difficult task of twisting the metal into a braid about the hose. Third, where stainless steel is used to form the reinforcement, the weight of the reinforced hose is substantial. Fourth, stainless steel hoses are susceptible to corrosion under certain conditions.

It is known that when a storage water heater is connected to a city water main, a galvanic action can be created. This galvanic action is created by the different kinds of metals present on the installation, creating electrical currents that tend to decompose the metal parts of the water heater and other associated fittings. The result is that the water heater may leak and eventually will have to be repaired or replaced.

In the past, hot water heaters, faucets, toilets, and other appliances were installed with rigid pipe such as copper tubing. This task was burdensome and not practical for do-it-yourself amateurs and homeowners. Corrugated flexible copper pipes and metal braided flexible connectors have been used, but none offer an electrically-insulating connection. Other types of insulating devices have been developed as shown in U.S. Pat. No. 4,991,876.

SUMMARY OF THE INVENTION

It is an object of the present invention to overcome the disadvantages associated with conventional reinforced hoses, and provide an improved reinforced hose for conducting fluids and gases.

It is another object of the present invention to provide an improved reinforced hose having a higher resistance to internal pressures, and rupture, relative to conventional reinforced hoses.

It is a yet another object of the present invention to provide an improved reinforced hose having an improved flexibility relative to conventional reinforced hoses.

It is a further object of the present invention to provide an improved reinforced hose that can be made by simplified manufacturing techniques relative to conventional reinforced hoses.

It is another object of the present invention to provide an improved reinforced hose that can be made by less expensive manufacturing techniques relative to conventional reinforced hoses.

It is yet another object of the present invention to provide an improved reinforced hose that is of a lighter weight relative to conventional reinforced hoses.

It is a further object of the present invention to provide an improved reinforced hose having an increased resistivity to corrosion relative to conventional reinforced hoses.

It is another object of the present invention to overcome the disadvantages of the conventional metal reinforced hoses and corrugated copper tubes, and provide an improved and reliable method for connecting an appliance such as a hot water heater, air conditioner, dishwasher, clothes washer, or other appliance with a city water main or other water supply line via electrically-insulating connection.

In accordance with the present invention, an improved reinforced hose for conducting fluids or gases is provided. The reinforced hose of the present invention includes an interior tube and an outer covering. The interior tube has an inner bore, in which fluids are conducted, and an outer surface. The outer covering is disposed directly about the outer surface of the interior tube for reinforcing the interior tube to resist rupture and provide enhanced flexibility, and is comprised of threads formed by disposing a plastic substance about a core material. Such plastic threads are formed into one or more braided layers. Preferably, the outer covering includes a single braided layer of plastic threads. That is, no intermediate layers are preferably interposed between the interior tube and the outer covering.

According to one aspect of the present invention, the plastic substance and core material employed to form the plastic threads are specifically selected. Preferably, the plastic substance comprises a vinyl or polyvinyl substance, whereas the core material comprises a plastic or polymeric material. More preferably, the plastic substance comprises polyvinyl chloride, whereas the core material comprises polyester filaments. The interior tube may, for example, comprise ethylene-propylene-compound diene, acrylonitrile-butadiene or Teflon™.

According to another aspect of the present invention, the threads are formed into distinct strands that are interwoven to form a braided layer. Preferably, each strand includes less than seven (7) threads. More preferably, each strand includes between about two (2) and five (5) threads. Most preferably, each strand includes between about two (2) and three (3) threads.

According to yet another aspect of the present invention, the gauge of the threads used to form the outer covering of the improved reinforced hose are empirically selected based on various factors. Preferably, the gauge of the threads ranges from about 0.005 of an inch to 0.060 of an inch. More preferably, the gauge of the threads ranges from about 0.010 of an inch to 0.040 of an inch. Most preferably, the gauge of the braided threads ranges from about 0.015 of an inch to 0.030 of an inch.

According to a further aspect of the present invention, the tension with which the outer covering is disposed about the interior tube is also empirically selected based on various factors. Preferably, such tension ranges from about one to two pounds. More preferably, such tension is approximately 1.5 pounds.

In accordance with the present invention, a method of manufacturing the improved reinforced hose is disclosed. Such method includes: (1) providing an interior tube having an inner bore, in which fluids are conducted, and an outer surface; (2) disposing a plastic substance about a core material to form plastic threads; and (3) interweaving the plastic threads about the outer surface of the interior tube to form one or more braided layers that reinforce the interior tube.

According to one aspect of the method of the present invention, the plastic substance is disposed about the core material by an extrusion technique.

According to another aspect of the invention, an electrically-insulating connection is made between the water main and an appliance such as a water heater.

Other objects, advantages and meritorious aspects of the present invention will be understood from the description of the preferred embodiments, appended claims and drawings.

BRIEF DESCRIPTION OF THE DRAWINGS

The present invention may be better understood from the following detailed description of preferred embodiments of the present invention with reference to the accompanying drawings, in which.

DETAILED DESCRIPTION OF PREFERRED EMBODIMENTS OF THE PRESENT INVENTION

Set forth below is a detailed description of preferred embodiments of the present invention.

IMPROVED REINFORCED HOSE

Figure 1:
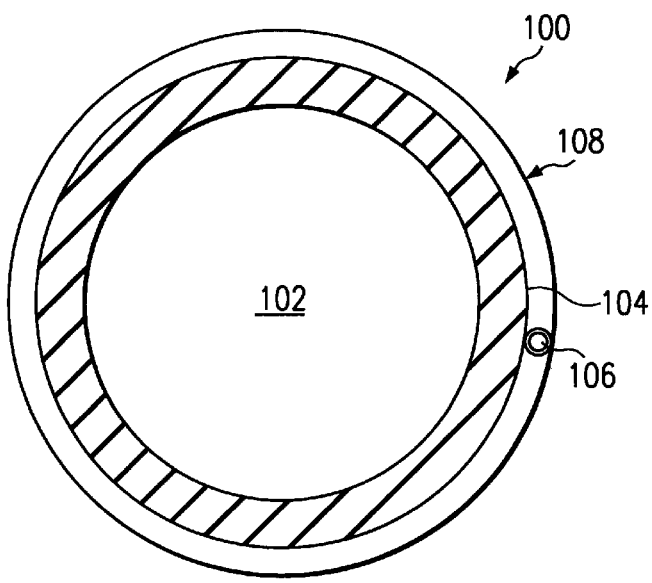
FIG. 1 is a cross-sectional view of an improved reinforced hose.

FIG. 1 illustrates a cross-sectional view of an improved reinforced hose 100, in accordance with a preferred embodiment of the present invention.

The reinforced hose illustrated in FIG. 1 includes an interior tube 104, having an inner bore 102, in which fluids and/or gases may be conducted therethrough. The interior tube 104 should be impervious and flexible, and is preferably comprised of a natural or synthetic polymer, copolymer or terpolymer. Selection of the interior tube 104 is based on the type of fluid or gas being conducted through the inner bore 102. For example, the interior tube 104 may comprise ethylene-propylene-compound diene (EPDM), or another plastic or rubber material, may be used when potable water is conducted through the inner bore 102. As a further example; acrylonitrile-butadiene may be used to conduct gaseous or petroleum products through the inner bore 102. As yet another example, the inner tube 104 may comprise Teflon™ when used to conduct chemicals.

An outer covering, generally identified by reference numeral 108, is disposed directly over, and surrounding, the outer surface of the interior tube 104. Such outer covering 108 is formed about the interior tube 104 to enable the hose 100 to withstand significant internal pressures through the inner bore 102 of the interior tube 104. In accordance with the present invention, the outer covering 108 is comprised of a plurality of plastic threads. An exemplary plastic thread 106 is illustrated in FIG. 1. Such threads 106 are preferably interwoven to form a braided layer, or otherwise suitably interlaced together, to form the outer covering 108. To increase the ability of the hose 100 to withstand high internal pressures, the outer covering 108 may include more than one braided layer formed about the interior tube 104. However, for most applications, a single braided layer of interwoven threads 106 is sufficient to provide the necessary reinforcement.

It should be appreciated that, in accordance with the present invention, no intermediate layers should be interposed between the interior tube 104 and the outer covering 108. Furthermore, no layers are preferably disposed above and surrounding the outer covering 108.

The flexibility of the reinforced hose 100 establishes a union between lines and pipes in an efficient and facilitated manner without having to resort to the use of conventional pipes and tubing. The reinforced hose 100 disclosed herein is especially applicable for use in the supply of fluids. For example, the hoses may be employed to distribute water to domestic sanitary appliances, such as toilets and sinks. However, it may also be used to supply gas. For example, the present invention may be used to supply gas to various domestic appliances, such as heaters, stoves and dryers.

Figure 1A:
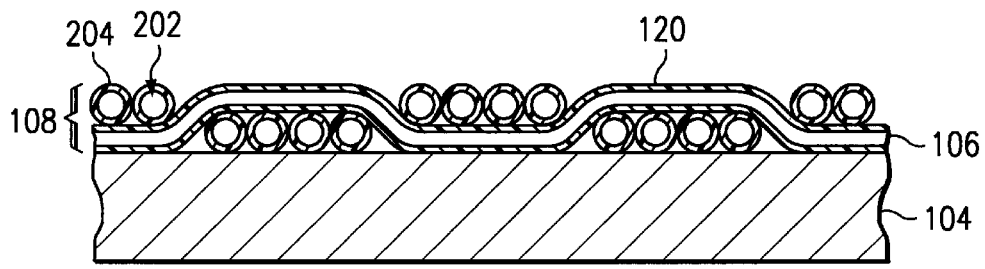
FIG. 1A is an enlarged sectional view of an outer covering of the improved reinforced hose of FIG. 1.

FIG. 1A illustrates an enlarged sectional view of the outer covering 108 of the improved reinforced hose 100 of FIG. 1, in accordance with a preferred embodiment of the present invention. As illustrated in FIG. 1, the outer covering 108 of the reinforced hose 100 includes multiple plastic threads 106 that are grouped or united into strands 120. The strands 120 are preferably braided about the interior tube 104 pursuant to the "two over, two under" method of braiding. Such method allows for the threads 106 included in each strand 120 to flatten out during the braiding operation and form rounded curves so that sharp bends are avoided.

Figure 1B:
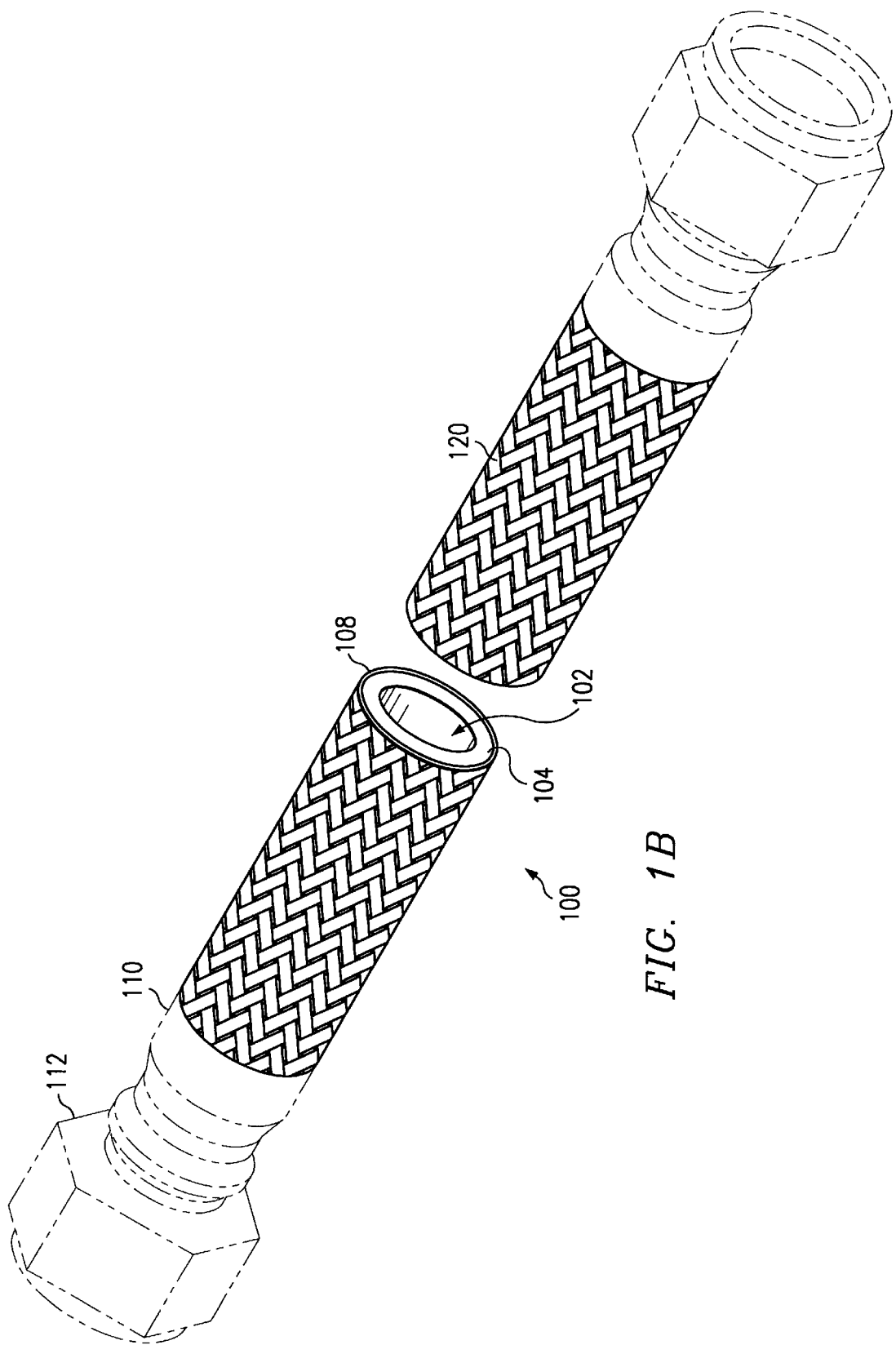
FIG. 1B is a perspective view of the improved reinforced hose of FIG. 1.

FIG. 1B illustrates a perspective view of the improved reinforced hose 100 of FIG. 1, in accordance with a preferred embodiment of the present invention. As illustrated in FIG. 1B, the reinforced hose 100 is provided with fittings 110 at both ends of the hose. Such fittings 110 are fastened to the reinforced hose 100 by crimping the fittings 110 to the ends. A set of connection terminals 112, preferably being threaded to mechanically connect each end of the hose 100 to other connectors, are further connected to the fittings 110.

THREADS

Figure 2:
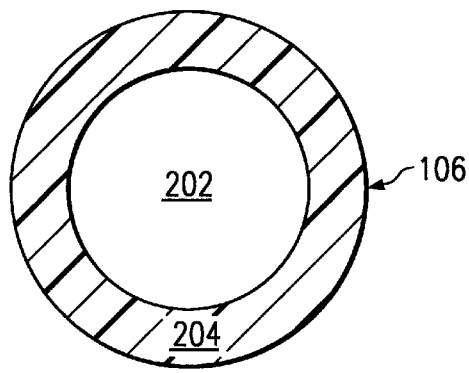
FIG. 2 is a cross-sectional view of a thread of the outer covering of FIG. 1.

FIG. 2 illustrates a cross-sectional view of a plastic thread 106 of the reinforced hose 100 of FIG. 1, in accordance with a preferred embodiment of the present invention.

The plastic threads 106, which form the outer covering 108 of the improved reinforced hose 100, are preferably formed by extruding a plastic substance 204 over a core material 202, as explained in more detail below. The plastic substance 204 thus forms the exterior of the threads 106, while the core material 202 forms the interior of the threads 106. Preferably, the plastic substance 204 comprises a vinyl or polyvinyl substance. More preferably, the plastic substance 204 comprises polyvinyl chloride. Preferably, the core material 202 comprises a plastic or polymeric material. More preferably, the core material 202 comprises a multi filament polyester material. Alternatively, the core material 202 may be formed from another plastic material, such as nylon.

It should be appreciated that the plastic substance 204 is preferably extruded individually over the core materials 202. That is, the core materials 202 are not collectively treated with the plastic substance 204. More specifically, the plastic substance 204 is not extruded over the core material 202 after the core material 202 has been disposed about the interior tube 104.

Gauges or diameters of the plastic threads 106 have been empirically selected in accordance with a preferred embodiment of the present invention. Preferably, the plastic threads 106 are formed to possess a gauge or diameter ranging from about 0.005 of an inch to about 0.060 of an inch. More preferably, the plastic threads possess a gauge ranging from about 0.010 of an inch to about 0.040 of an inch. Most preferably, the plastic threads possess a gauge ranging from about 0.015 of an inch to about 0.030 of an inch.

Tensions with which the outer covering 108 is disposed about the interior tube 104 have been empirically selected in accordance with a preferred embodiment of the present invention. Preferably, such tension is between about 1 to about 2 pounds. More preferably, such tension is approximately 1.5 pounds. These tension values provide a greater flexibility and resistance to rupture in the reinforced hose 100 of the present invention. Furthermore, these preferred tension values are significantly less than the tensions employed in connection with stainless steel and aluminum reinforced hoses.

Values for the portion of the outside surface of interior tube 104 that is covered by the outer covering 108 (hereinafter referred to as "coverage area") have been empirically selected in accordance with a preferred embodiment of the present invention. Preferably, the coverage area is between about 75% and 100%. More preferably, the coverage area is between about 90% and 100%. Most preferably, the coverage area is approximately 95%.

EXAMPLES OF IMPROVED REINFORCED HOSE

Table 1, set forth below, provides examples of reinforced hoses 100 made in accordance with a preferred embodiment of the present invention.

TABLE 1

| Outer Diameter of Interior Tube | Number of Threads in a Strand | Gauge of Threads | Number of Strands | Outer Diameter of Hose with Reinforcement |
|---|---|---|---|---|
| .400 inch | 2 | 0.025 inch | 24 | 0.465 inch |
| .400 inch | 3 | 0.020 inch | 24 | 0.465 inch |
| .470 inch | 2 | 0.025 inch | 24 | 0.535 inch |
| .470 inch | 3 | 0.025 inch | 24 | 0.540 inch |
| .600 inch | 2 | 0.025 inch | 24 | 0.645 inch |
| .840 inch | 3 | 0.025 inch | 24 | 0.910 inch |

The examples of the present invention listed in Table 2 are based on reinforced hoses, made in accordance with the present invention, that are currently being marketed by the INDUSTRIAL DE MANGUERAS REFORZADAS, S. A. DE C. V. of Monterrey, Mexico under the trade name "COFLEX VINILO."

Based on several factors—including, the outer diameter of the interior tube 104, the gauge of the threads 106 selected, and the number of strands 120 used to form the braided layer—the number of threads 106 in a strand 120 employed in the reinforcement layer 108 is empirically selected, in accordance with a preferred embodiment of the present invention. In the examples set forth in Table 1, the number of threads 106 united in a particular strand 120 were empirically selected based on an outer diameter of the interior tube 104 ranging from 0.400 to 0.800 of an inch, a gauge of the threads 106 ranging from 0.020 to 0.025 of an inch, and twenty-four (24) strands used to form the braided layer. Preferably, less than seven (7) threads 106 are included in a strand. More preferably, between about two (2) and five (5) threads 106 are included in a strand. Most preferably, between about two (2) and three (3) threads 106 are included in a strand, as indicated in Table 1.

METHOD OF MANUFACTURE

The process of extruding the outer covering 204 over the core material 202 to form the plastic threads 106 is the initial step of the manufacturing process. After the plastic substance 204 is extruded over the core material 202, the resulting thread 106 is cooled to room temperature. Such cooling may, for example, be provided by placing the thread 106 under water after extrusion. Thereafter, one or more threads are united to form a strand 120, which is then wound around a bobbin or spool. As discussed above, the characteristics of the threads 106 in a strand 120—including the number and gauge—are empirically selected based on numerous factors, such as the outer diameter of the interior tube 104 and the number of strands 120 used to form a braided layer of the outer covering 108.

Figure 3:
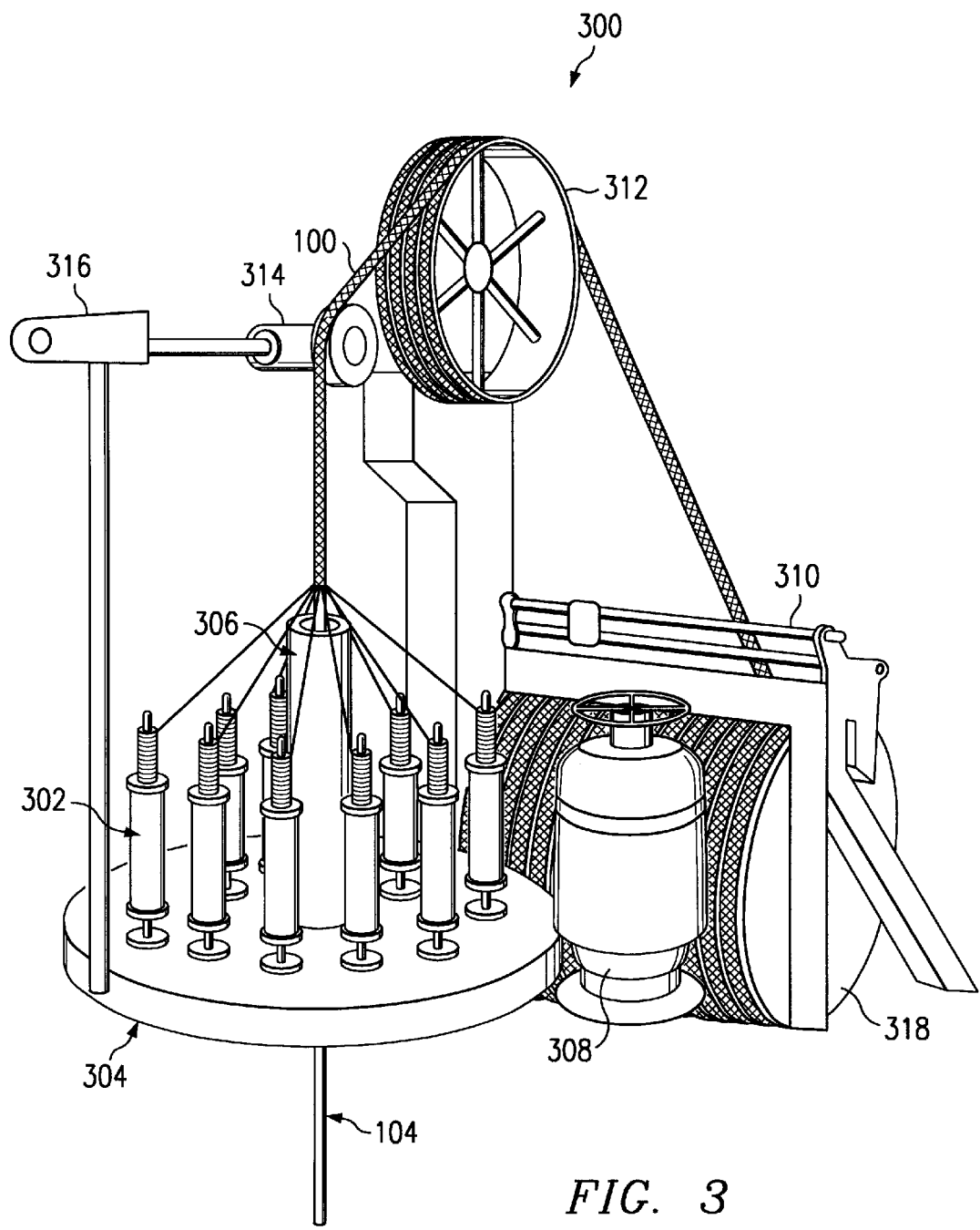
FIG. 3 illustrates an assembly for manufacturing the reinforcement hose of FIG. 1.

FIG. 3 illustrates an assembly for manufacturing the reinforcement hose of FIG. 1 and its associated method, in accordance with a preferred embodiment of the present invention. The assembly 300 illustrated in FIG. 3 includes a series of bobbins 302, about which the plastic threads 106 are stored, that are disposed on a platform 304. The bobbins 302, each supplying a strand 120 of threads 106, are operable to rotate about their own axis. An interior tube 104 is directed through an aperture in the platform 304 and through a guide 306 disposed above the platform 304. A motor 308 is mechanically connected to the platform 304 as well as a pulley 312.

The braiding formed about the interior tube 104 is formed by interweaving the strand 120 of threads 106 from each bobbin 302 about the outside surface of the interior tube 104. This is accomplished by rotating the platform 304 by motor 308 around the interior tube 104. Each braided layer is therefore formed by the circulation of the bobbins 302 around the interior tube 104. As a consequence, the reinforced hose 100 is generated.

After braiding, the formed reinforced hose 100 is directed over a second guide 314, which is maintained in position by arm 316, and towards the pulley 312. The reinforced hose 100 is pulled by the pulley 312 by the motor 308 in synchronization with the rotation of the platform 304. The pleating machine 310 pulls the reinforced hose 100 from the pulley 312 and coils the hose 100 in a spool 318. The hose 100 may then be later uncoiled from the spool 318, and cut into different lengths. Connection terminals 112 (illustrated in FIG. 1B) may be placed at either end of the hose 100 to enable connection of the hose 100 to various other connectors. Such connection terminals 112 may be secured to the ends of the hose 100 by fittings 110 using a pneumatic or hydraulic mechanisms, or other techniques known in the art, to ensure that the hose 100 will be able to resist high pressures and not render leaks.

The aforementioned manufacturing method is inexpensive and simplified when compared to those employed to manufacture conventional reinforced hoses, such as hoses reinforced by stainless steel braids. This is primarily attributable to the fact that the plastic threads 106 have a significantly greater flexibility and lesser weight than stainless steel wires. Because of such improved resistance, the assembly 300 is able to operate at significantly higher rates and speeds, than it is capable of operating to form the stainless steel braids, since the problem of a broken thread is encountered infrequently. Further, the plastic threads 106 of the present invention, unlike aluminum and stainless steel wires, do not require the application of lubricants to the bobbins 302 so as to decrease friction between the metallic wires of conventional reinforced hoses. Still further, the assembly 300 is not subjected to wear and tear that it would be if metal wires were used to form the braiding layer. The resulting cost savings of using the plastic threads 106 to form the outer covering, as opposed to stainless steel wires, allows the assembly 300 to decrease the cost of manufacturing the reinforced hose.

COMPARISON WITH CONVENTIONAL HOSES

Table 2, sets forth below, provides a comparison of the reinforced hose 100 of the present invention with those reinforced by aluminum and stainless steel threads.

superior when compared to hoses bearing stainless steel or aluminum reinforcements. Specifically, when compared to the stainless steel and aluminum reinforced hoses, the plastic reinforced hose: (1) possesses a markedly higher burst pressure; (2) a weight of approximately half that of a stainless steel reinforced hose; (3) a cost of manufacturing (not including cost of reinforcements) that is 20% and 30% less than the cost of manufacturing stainless steel and aluminum reinforced hoses, respectively; (4) a higher degree of resistivity to corrosion as well as detergents and acids; (5) a greater degree of flexibility; and (6) the ability to bend without causing a permanent distortion in the reinforcement and, in turn, restricting the flow through the hose. It should be noted that at current market prices, stainless steel threads (which are generally preferred to aluminum threads because of poor resistivity attributes and relatively low burst pressures) cost significantly more than the plastic reinforced threads 106. When considered, this further increases the cost of manufacture relative to a plastic reinforced hose 100.

Figure 4:
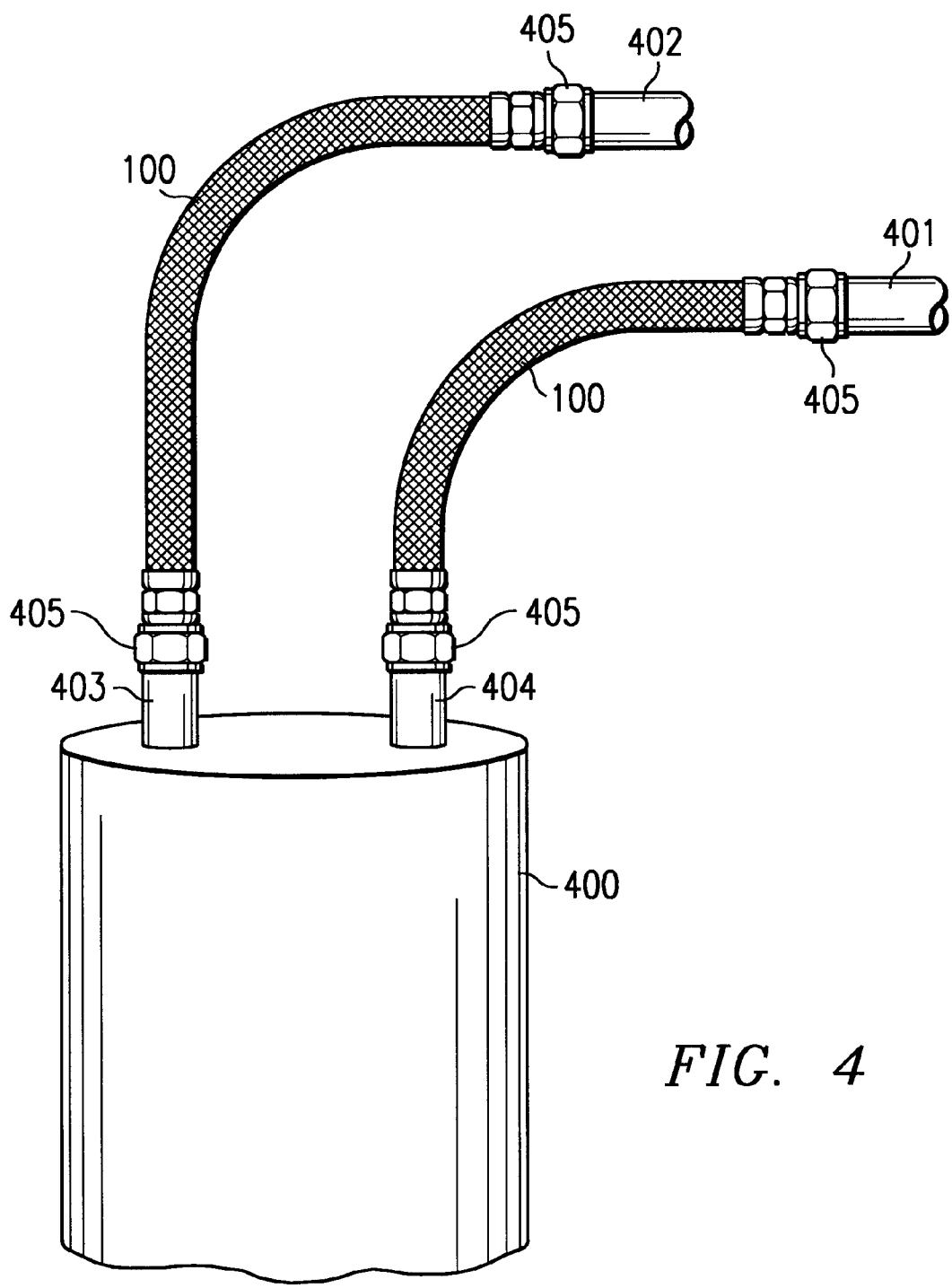
FIG. 4 illustrates a part of a hot water heater installed with the improved reinforced hose of FIG. 1.

FIG. 4 illustrates a hot water heater 400 water conduit 401 conducting water into the water heater, and water conduit 402 conducting the hot water from the water heater. Conduits 401 and 402 can be made out of copper, galvanized iron or brass.

The hot water heater 400 has a water outlet 403 and a water inlet 404 comprising short conductive female fittings, nipples, threaded pipe fittings, or other fittings known in the art.

The water outlet 403 and the water inlet 404 can be dielectrically connected to the conduits 401 and 402 by the means of reinforced hoses 100 an accordance with this embodiment:

The fittings 405 located at each end of the reinforced hose 100 provides high security and fluid tight connections, they can be male fittings, compression fittings, female fittings or other fittings known in the art. These fittings are preferably made of brass, but can also be made of other materials. For example, stainless steel, copper or galvanized iron may be used.

The novel reinforced hose 100 provides an easy, reliable economical electrically-insulating connection between a water line and a hot water heater or other appliance.

The present invention is, therefore, well adapted to carry out the objects and attain the ends and advantages mentioned, as well as others inherent therein. While presently preferred embodiments of the invention have been given for the purposes of disclosure, alternative embodiments, changes and modifications in the details of

TABLE 2

| Thread | Burst Pressure | Weight Per Meter | Cost of Manufacture (Base = 1) | Corrosion Resistivity | Detergent & Acid Resistivity | Flexibility | Ability to Bend Without Distortion |
|---|---|---|---|---|---|---|---|
| Stainless Steel (304 Soft Run) | 1,800–2,000 psi | 0.06 kg | 1.2 | Good/ Excellent | Good | Good | Poor/Good |
| Aluminum | 1,000–1,200 psi | 0.03 kg | 1.3 | Poor/Good | Poor | Good | Poor/Good |
| Plastic (PVC) | 2,000-2,200 psi | 0.03 kg | 1.0 | Excellent | Excellent | Excellent | Excellent |

As seen from Table 2, the improved reinforced hose of the present invention, which employs plastic threads 106, is construction, interconnection and arrangement of parts will readily suggest themselves to those skilled in the art after having the benefit of this disclosure. This invention is not necessarily limited to the specific examples illustrated and described above. All such alternative embodiments, changes and modifications encompassed within the spirit of the invention are included, and the scope of the invention is defined by a proper construction of the following claims.

What is claimed is:

1. A flexible hose for conducting fluids or gases between an appliance and a fluid or gas carrier comprising:

an electrically-insulating interior tube having an inner bore in which fluids are conducted and an outer surface;

an outer covering disposed directly about the outer surface of the interior tube, the outer covering including one or more braided layers of plastic threads, the plastic threads being formed by disposing a plastic substance about a core material, such that the outer covering reinforces the interior tube to resist rupture and provide enhanced flexibility characteristics wherein said electrically-insulating interior tube and said outer covering together comprise an insulating reinforced hose; and fittings at each end of said insulating reinforced hose, wherein one of said fittings is adapted to connect to a fitting on said appliance and the other of said fittings is adapted to connect to a fitting on said fluid or gas carrier.

2. The flexible hose of claim 1 wherein said fluids conducted in said inner bore are gases.

3. The flexible hose of claim 1 wherein said fluids conducted in said inner bore are liquids.

4. The flexible hose of claim 1 wherein said plastic substance is a vinyl substance.

5. The flexible hose of claim 1 wherein the core material comprises plastic material.

6. The flexible hose of claim 1 wherein the core material comprises polyester filaments.

7. The flexible hose of claim 1 wherein said one or more braided layers of plastic threads is a single braided layer is disposed directly over said outer surface of said interior tube.

8. The flexible hose of claim 1 wherein the plastic threads are grouped into distinct strands that are interwoven to form the one or more braided layers of threads.

9. The flexible hose of claim 1 wherein each strand includes less than seven (7) plastic threads.

10. The flexible hose of claim 1 wherein each strand includes between about two (2) and five (5) plastic threads.

11. The flexible hose of claim 1 wherein the gauge of the plastic threads ranges from about 0.005 of an inch to about 0.060 of an inch.

12. The flexible hose of claim 1 wherein the tension with which the outer covering is disposed about the interior tube ranges from about one to about two pounds.

13. The flexible hose of claim 1 wherein the tension with which the outer covering is disposed about the interior tube is approximately 1.5 pounds.

14. The flexible hose of claim 1 wherein the interior tube comprises ethylene-propylene-compound diene.

15. The flexible hose of claim 1 wherein the interior tube comprises acrylonitrile-butadiene.

16. The flexible hose of claim 1 wherein the interior tube comprises polytetrafluorethylene.

17. The flexible hose of claim 1 wherein the fittings are brass.

18. The flexible hose of claim 1 wherein said appliance is a hot water heater.

19. The flexible hose of claim 1 wherein said appliance is a dishwasher.

20. A flexible hose for connecting an appliance to a water pipe comprising:

an electrically-insulating interior tube having an inner bore in which water is conducted and having an outer surface;

a single braided layer of plastic threads directly over said outer surface, said plastic threads being grouped into distinct strands that are interwoven to form said single braided layer of plastic threads and being formed by disposing a plastic substance about a core material, such that said outer covering reinforces said interior tube to resist rupture and provide enhanced flexibility characteristics wherein said interior tube and said covering disposed over its outer surface together comprise an insulating reinforced hose; and fittings at each end of said reinforced hose, wherein one of said fittings is adapted to connect to a fitting on said appliance and the other of said fittings is adapted to connect to a fitting on said water pipe.

21. The flexible hose of claim 20 wherein the tension with which the outer covering is disposed about the interior tube ranges from about one to about two pounds.

22. A method of connecting an appliance to a water pipe, the method comprising:

providing an electrically-insulating interior tube having an inner bore in which water is conducted and having an outer surface;

providing a single braided layer of plastic threads directly over the outer surface of the interior tube covering, said plastic threads being grouped into distinct strands that are interwoven to form said single braided layer of plastic threads and being formed by disposing a plastic substance about a core material, such that the outer covering reinforces the interior tube to resist rupture and provide enhanced flexibility characteristics wherein said electrically-insulating interior tube and said covering disposed over its outer surface together comprise an insulating reinforced hose; and providing fittings at each end of said reinforced hose, wherein one of said fittings is adapted to connect to a fitting on said appliance and the other of said fittings is adapted to connect to a fitting on said water pipe.

* * * * *